US008386285B2

(12) United States Patent
Chen et al.

(10) Patent No.: US 8,386,285 B2
(45) Date of Patent: Feb. 26, 2013

(54) DEMAND MODELING AND PREDICTION IN A RETAIL CATEGORY

(75) Inventors: Yiwei Chen, Cambridge, MA (US); Ramesh Natarajan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/115,748

(22) Filed: May 25, 2011

(65) Prior Publication Data

US 2012/0303411 A1  Nov. 29, 2012

(51) Int. Cl.
*G06Q 40/00* (2012.01)
(52) U.S. Cl. ...................... 705/7.11; 705/7.42
(58) Field of Classification Search ............... 705/7.11, 705/7.42
See application file for complete search history.

(56) References Cited

U.S. PATENT DOCUMENTS

| | | | | |
|---|---|---|---|---|
| 6,032,123 | A * | 2/2000 | Jameson | 705/7.22 |
| 6,988,076 | B2 * | 1/2006 | Ouimet | 705/7.36 |
| 7,912,748 | B1 * | 3/2011 | Rosenberg et al. | 705/7.35 |
| 2005/0197896 | A1 * | 9/2005 | Veit et al. | 705/14 |
| 2005/0197897 | A1 * | 9/2005 | Veit et al. | 705/14 |
| 2006/0161504 | A1 * | 7/2006 | Walser et al. | 705/400 |
| 2010/0318403 | A1 * | 12/2010 | Bottom | 705/10 |

* cited by examiner

*Primary Examiner* — Thomas Dixon
*Assistant Examiner* — Benjamin S Fields
(74) *Attorney, Agent, or Firm* — Scully, Scott, Murphy & Presser, P.C.; Daniel P. Morris, Esq.

(57) ABSTRACT

System, method and computer program product for demand modeling and prediction in retail categories. The method uses time-series data comprising of unit prices and unit sales for a designated choice set of related products, with the time-series data obtained over a given sequence of sales reporting periods, and over a collection of stores in a market geography. Other relevant data sets from participating retail entities that include additional product attribute data such as market and consumer factors that affect retail demand are further used. A demand model for improved accuracy is achieved by individual sub-modeling method steps of: estimating a model for price movements and price dynamics from the time series data of unit-prices in the aggregated sales data; estimating a model for market share of each product in the retail category using the aggregated sales data and integrated additional product attribute data; and, estimating generating a model for an overall market demand in the retail category from the aggregated sales data.

24 Claims, 11 Drawing Sheets

A) EXAMPLE OF SALES DATA

| TDLINX | UPC | WEEK | QUANTITY | REVENUE | UNIT PRICE |
|---|---|---|---|---|---|
| XXXXXX | 111111111 | 20060819 | 14 | $23.66 | $1.69 |
| YYYYYY | 222222222 | 20060819 | 20 | $53.80 | $2.69 |
| ZZZZZZ | 333333333 | 20060826 | 44 | $66.00 | $1.50 |

50 — 52, 54, 56, 58, 60, 62

B) EXAMPLE OF PRODUCT ATTRIBUTES DATA

| UPC | MANUFACTURER | PACKAGE SIZE | FLAVOR | CALORIES PER SERVING | CALORIES (FAT) PER SERVING |
|---|---|---|---|---|---|
| 222222222 | ABCD | 5 OZ | XX | 300 | 140 |
| 333333333 | XYZ | 6 OZ | YY | 300 | 120 |
| 333333333 | ABCD | 4 OZ | ZZ | 250 | 100 |

DEMAND MODELING AND PREDICTION IN A RETAIL CATEGORY

BACKGROUND

The present disclosure generally relates to decision-support methods that are used by consumer-product manufacturers and/or consumer store and retail chains for a variety of retail applications in the areas of inventory optimization, product pricing, product-line rationalization and promotion planning; more particularly, the present invention relates to a system and method for accurate demand modeling and prediction in retail categories.

Demand models are an important component of several retail decision-support applications used by various entities in a retail supply chain including consumer product manufacturers and/or consumer retail chains and individual retail stores. Some examples of retail applications that require accurate demand models for individual products, or for entire retail categories, include, for instance, inventory optimization, product pricing, product-line rationalization, and promotion planning. As a specific example, the architecture of a retail pricing decision-support system is discussed in A. L. Montgomery, "The Implementation Challenge of Pricing Decision Support Systems for Retail Managers, Applied Stochastic Methods in Business and Industry, Vol. 27(4-5), pp. 367-378, 2005, which provides a detailed rationale for demand models for retail categories in that specific context.

In the broader context of these retail decision-support applications, it would be highly desirable to provide a system and method for obtaining more accurate and comprehensive models for the demand modeling component that, as a result, yields significant improvements in the performance and effectiveness of the overall decision-support application.

Various approaches have been considered for retail demand modeling in the prior art. In particular, in methods that are embedded in existing commercial products, it is discerned that the methods for retail demand modeling in the prior art are invariably based on univariate time-series analysis approaches, wherein, each product is analyzed separately and independently from other products, rather than jointly, even for competing products within the same retail product category.

Furthermore, the methods in the prior art are invariably based on the direct time-series analysis of the unit-sales data itself (note that this time-series analysis is performed with the transactional unit-sales data being aggregated to the time-series of daily, weekly or quarterly unit sales, in accordance and consistent with the sales and replenishment reporting cycles for the chosen product). For instance, many approaches for demand modeling in the prior art are based on the Holt-Winters exponential smoothing algorithm for univariate time series, which is particularly suitable for retail data which contains trend and seasonality effects. A background description of time-series methods, including the methods that have been widely adopted in prior art for demand modeling, can be found in P. J. Brockwell and R. J. Davis, "Introduction to Time Series and Forecasting," Springer-Verlag, New York, 2002.

The univariate time-series methods, as described above, are often augmented by certain multivariable extensions to the basic methodology for demand modeling applications. For example, a variety of relevant causal factors can be included in the methods of the prior art for demand modeling, wherein the relevant causal factors, which consist of known and specified auxiliary time-series of variables which are included in the modeling, since these variables are known to influence the time series for the primary variable that needs to be forecasted, in this case, the unit-sales time series for the chosen product of interest. In principle, there are no restrictions on the choice of relevant causal factors that can be included in this approach for the demand modeling analysis; in practice, however, these causal factors are usually endogenous to the chosen product of interest, or equivalently, the causal factors are restricted to attributes of the chosen product of interest itself (for example, the corresponding unit-price time series data in each sales-reporting period is usually a causal factor for predicting the unit-sales sequence for the chosen product of interest; in addition, other endogenous causal factors will include the corresponding promotion codes and/or inventory stock-out codes for the given product in each sales reporting period).

Stated alternatively, these demand model and forecasts in the prior art do not typically incorporate any causal factors that are associated with the price or product characteristics of any of the competing products in the retail category, although the accuracy of the resulting demand models can often be significantly improved by incorporating the relevant causal factors that are exogenous to the chosen product of interest.

Two reasons are discerned for the demand modeling methods in the prior art being limited to univariate time series methods, or to extensions of univariate time series methods that only incorporate endogenous causal factors:

The first reason is particularly relevant for the case of demand models used by consumer-product manufacturer; here, it is noted that the eventual unit-price at which chosen product is sold to the customer is typically fixed by either the retail chain or the individual retail store, and the markup and discount policies that are used to set the retail price are not always known to the consumer-product manufacturer. In this case, therefore, the actual unit-price for the product sales will need to be obtained, often at a significant expense, either from market audits and surveys or from third-party information aggregators. Even in the case of vendor-managed inventory products, where the consumer-product manufacturer has access to the eventual point-of-sales data, the corresponding unit-price data for any competitor products in the same individual retail chain or store, is often not directly available to the consumer-product manufacturer, and this competitor sales data, therefore, will need to be obtained, often at significant expense, from the individual retail chain and store, or from third-party information aggregators. These data-availability issues may only be germane to consumer-product manufacturers, or to other intermediate supply-chain entities who do not directly market their products to the end-customer; however, retail chains or individual retail stores that interact directly with the end-customer also face similar difficulties in procuring the relevant sales data from other retail chains, and therefore, as noted above, this data will need to be obtained at significant expense from third-party information aggregators.

In the absence of the sales and demand data from a larger set of retail chains, in some cases, it may not be possible to obtain statistically-significant estimates of the demand model parameters, particularly for more-complex demand models which incorporate numerous parameters as a consequence of using an extensive set of causal factors based on competitive product attributes or sales data.

The second reason is that even when the unit-sales and unit-price data for competitor products in the retail category is available, thereby allowing and extensive set of competing sales and product attributes to be incorporated in the demand modeling using the causal factor approach as envisioned above, an additional complication arises when the resulting demand models are used for subsequent prediction or forecasting. This complication is due to the fact that some of the competitor product attributes used as causal factors in the demand model, including for example the unit-prices and promotion codes for competitor products, are "non-controllable" factors; in effect, the inclusion of these exogenous product attributes as causal factors in the time-series demand model leads to the situation that these values are not explicitly known in a prediction or forecasting scenario, and furthermore, requiring assumptions on their values will invariably limit the accuracy of the demand models for prediction or forecasting.

In summary, the methods for demand modeling in the prior art are limited, particularly, in terms of incorporating all relevant and potentially-important, competing-product effects as causal factors in the demand modeling analysis.

In addition, these methods in the prior art do not typically provide a joint model for all the competing products in the retail category, which is necessary in order to capture the product substitution and cross-elasticity effects in certain retail categories.

Therefore, this leads to inherent limitations in the accuracy of the methods for demand modeling in the prior art, and to inherent limitations in their usefulness for decision-support applications, particularly in cases where competing product effects and product substitution are significant factors within a retail category. In fact, most, if not all, retail decision-support applications, would significantly benefit from incorporating competitor-product data and attributes in the demand modeling, and furthermore, the inclusion of these effects is central to several decision-support applications where accurate demand modeling is required, such as product cannibalization, product rationalization, joint promotions and strategic pricing.

SUMMARY

There is provided a system, method and computer program product for demand modeling and prediction in retail categories, in which the overall method includes a sequence of individual sub-modeling method steps.

Accordingly, in one embodiment, there is provided a system, computer-implemented method and computer program product for demand modeling and prediction for a set of products in a retail category. The method comprises:

obtaining aggregated sales data in a retail category, the aggregated sales data comprising a combination of: a first sales data set having a time series of unit-prices and unit sales for a set of designated products in a product set from the retail category; the time series data in this sales data set being provided over a sequence of sales reporting periods from one or more retail stores; and, a second sales data set including data associated with attributes of a product in the first sales data set;

generating a model for price movements and price dynamics from the time series data of unit-prices in the aggregated sales data;

generating a model for market share of each product in the designated product set in the retail category using the aggregated sales data and the additional product attribute data;

generating a model for an overall market demand in the designated product set in the retail category from the aggregated sales data; and, obtaining a predicted demand for one or more products in the designated product set in retail category by combining the models for the price movements and price dynamics, the market share, and the overall market demand, wherein a programmed processor device performs the acquiring, the integrating, the estimating price movement, the estimating market share, the estimated overall market demand and the combining.

Further to this, in the computer-implemented method, the generating a model for price movements and price dynamics from the time-series sales data of unit-prices comprises: mapping price values from the time series of unit-prices to a corresponding price mode; modeling dynamics of a price mode transition process; and, calibrating the price mode transition process by using a maximum likelihood estimation technique to estimate model parameters, wherein unit price predictions are obtained from the price dynamics model.

In a further embodiment, a system for demand modeling and prediction for a set of products in a retail category is provided that comprises:

a processor unit; and at least one memory device connected to the processor unit, wherein the processor unit is configured to:

obtain aggregated sales data in a product category, the aggregated sales data comprising a combination of: a first sales data set having a time series of unit-prices and unit sales for a sales for a designated product set, in a product set from the product category product, the time series data being provided over a sequence of sales reporting periods from one or more retail stores; and, a second sales data set including data associated with attributes of the product in the first sales data set;

generate a model for price movements and price dynamics from the time series data of unit-prices in the aggregated sales data;

generate a model for market share of each product in the designated product set in the retail category using the aggregated sales data and the integrated additional product attribute data;

generate a model for an overall market demand in the designated product set in the retail category from the aggregated sales data; and, obtain a predicted demand for one or more products in the designated product set in retail category by combining the models for the price movements and price dynamics, the market share, and the overall market demand.

Further to this, the generating a model for price movements and price dynamics from the time-series sales data of unit-prices comprises: mapping price values from the time series of unit-prices to a corresponding price mode; modeling dynamics of a price mode transition process; and, calibrating the price mode transition process by using a maximum likelihood estimation technique to estimate model parameters, wherein unit price predictions are obtained from the price dynamics model.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the accompanying description, serve to explain the principles of the invention.

In the drawings,

FIG. 2 illustrates contents of the primary data set and any auxiliary data sets that can be used to implement the method of FIG. 1;

DETAILED DESCRIPTION OF THE INVENTION

Figure 1:
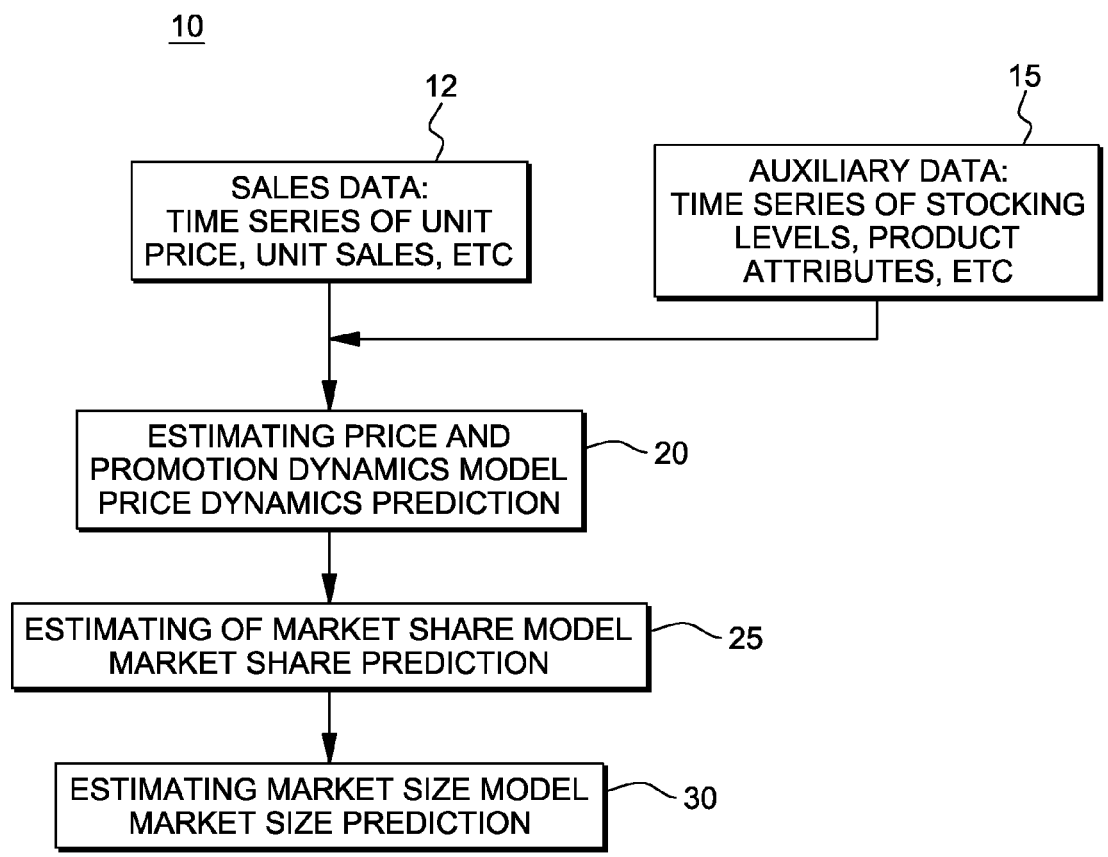
FIG. 1 illustrates a method for demand modeling and prediction in retail categories according to one embodiment.

FIG. 1 is a high-level schematic of a method 10 that may be used to support a client decision-support application that requires, as a component, a demand model or demand forecast for a set of relevant products in a given retail category. The set of relevant products (both for the instant company ("self") and a "competitor" company) that includes a designated "choice set" for the retail category, are selected. In one embodiment, this selection may be performed using an SQL query which combines product master data including retail category codes, or alternatively predefined choice set assignments of the products, along with the relevant retail time series data for this choice set. Then, an analysis data set is obtained by integrating the data from a set of relevant data sources, which may include databases accessible directly, or remotely, e.g., such as via wired or wireless communications over a network. For example, the said combined data set may include data from a primary data source which may include the aggregate retail sales data in the form of a set of time series for the unit sales and unit price over multiple stores, as well as data from non-primary and/or auxiliary data sources, which may include but are not limited to: the attributes for the products in the product set; the store attributes and consumer demographics for the stores and chains in the sales data set; in-store promotions, discounts, coupons and advertising information; and, inventory supply and stocking levels for the products in the product set. A generic and particular description of such a combined data set is given below.

More particularly, FIG. 1 illustrates a method 10 for demand modeling and prediction in retail categories according to one embodiment. The method involves analyzing the competitive sales data for a relevant set of related products in the selected retail product category, with this sales data being obtained across one or more entities, e.g., retail stores.

In the embodiment, as shown in FIG. 1 at step 12, the suitable data set for the demand modeling analysis is obtained, e.g., from a memory storage device, and processed by a computer processing system according to the embodiments described in greater detail herein. The data set for the demand modeling analysis is received as a time-series sequence of unit sales and unit prices over several sales-reporting periods, obtained over a plurality of products in the retail category, and across a plurality of retail stores stocking these products. The sales reporting period is typically weekly for grocery stores, but daily, monthly or even quarterly reporting periods may be appropriate for other retail establishments.

For data sets with a weekly reporting period, the time-series sequence may cover several weeks to months, or even years of data. Similarly, the plurality of retail stores in the sales data set may all belong to a same retail chain, or belong to a plurality of retail chains within the same retail market geography, (in order that these stores may stock the same product set for the retail category).

The input sales data sets for this demand modeling analysis may be obtained in one or more ways:

1) by aggregating from the point-of-sales systems in the plurality of stores of a single retail chain, for example, via approach as described in R. E. Bucklin and S. Gupta, "Commercial Use of UPC Scanner Data: Industry and Academic Perspectives", Marketing Science, Vol. 18(3), pp. 247-273, 1999);

2) by analyzing and aggregating billing and purchase data from the retail databases and store vendor-managed inventory systems, for example, via approach as described in (D. D. Achabal, S. H. McIntyre, S. A. Smith, K. Kalyanam, « A Decision Support System for Vendor Managed Inventory," Journal of Retailing, Vol. 76(4), pp. 430-454, 2000); and 3) by subscribing to the sales databases of commercial aggregators of retail sales data such as Nielsen (http://en-us.nielsen.com) and SymphonyIRI (http://www.symphonyiri.com).

The data sets obtained from a point-of-sales system in a retail chain includes the sales data from stores within the same retail chain network; similarly, the data sets from vendor-managed inventory systems excludes sales data on competing products from other vendors and manufacturers; and finally, the data sets from commercial aggregators of retail sales data may cover a broader range of products and stores, however, excludes the sales data on "private-label" products which data retailers may be reluctant to release to external entities for facilitating any competitive demand analysis.

Thus, in one aspect, the data sets obtained from these three potential data sources are used for the demand modeling, and furthermore, the impact on the accuracy and quality of the demand models due to any partial or incomplete data is addressed by combining the data from these individual data sources, and/or by using data imputation techniques for estimating any missing data information. For example, sales data, e.g., from point-of-sales systems, inventory data from stocking and delivery systems, and product information data, e.g., from product master data databases, may be integrated (combined) using standard database query operations such as selection, filtering, joining, merging and sorting. Software implementing the relevant missing data imputation techniques for obtaining complete data sets without the original missing or incomplete data may be found in many statistical packages such as SAS, SPSS and R, see for example, J. Honaker, G. King and M. Blackwell, Amelia II: A Program for Missing Data, http://mirror.hmdc.harvard.edu/CRAN/web/packages/Amelia/vignettes/amelia.pdf, November 2010. One data imputation technique used to provide (estimate) missing data information that can be employed is described in commonly-owned U.S. patent application Ser. No. 13/115,723 entitled METHOD FOR DEMAND MODELING IN RETAIL CATEGORIES USING RETAIL DATA SETS WITH MISSING DATA ELEMENTS, the whole disclosure and contents of which is incorporated by reference as if fully set forth herein.

In one embodiment, a primary data set for the demand modeling includes competitive product-sales data in the retail category, as mentioned above, as shown in FIG. 1, there is further received and stored/retrieved for processing several auxiliary data sources 15 for improving the demand model accuracy. Example auxiliary data sources include, but are not limited to: invoice and delivery records, inventory stock and on-shelf data, advertising and promotions details, coupons and store discounts, and consumer demographic information.

However, as observed earlier, the method includes combining the datum 12, 15 of FIG. 1, e.g., by database operations in which a final data table is created from multiple individual data tables through various operations that might involving database select, joins, sorts and merges, as the datum are obtained from a variety of different entities (disparate data sources) in the retail supply chain, including consumer product (CP) manufacturers, retail distributors, and individual retail chains and stores, in addition to external entities, including third-party market research firms, census database providers, econometric data providers, and commercial aggregators of retail sales data. In one embodiment, as forecasts can be made for one, for several, or for all the products in a designated product set, the product set includes the entire set of products in the retail category that may have significant sales-substitution or cross-elasticity behavior.

With respect to the overall evolution of retail decision-support applications, many retail organizations have been implementing specially-architected, collaborative IT platforms so that the various entities in retail supply chain can host, integrate and share their respective data, and in this way, support their individual as well as collective decision-support applications. These collaborative IT platforms and environments include Demand Sensing Repositories, or DSR's.

Figure 12:
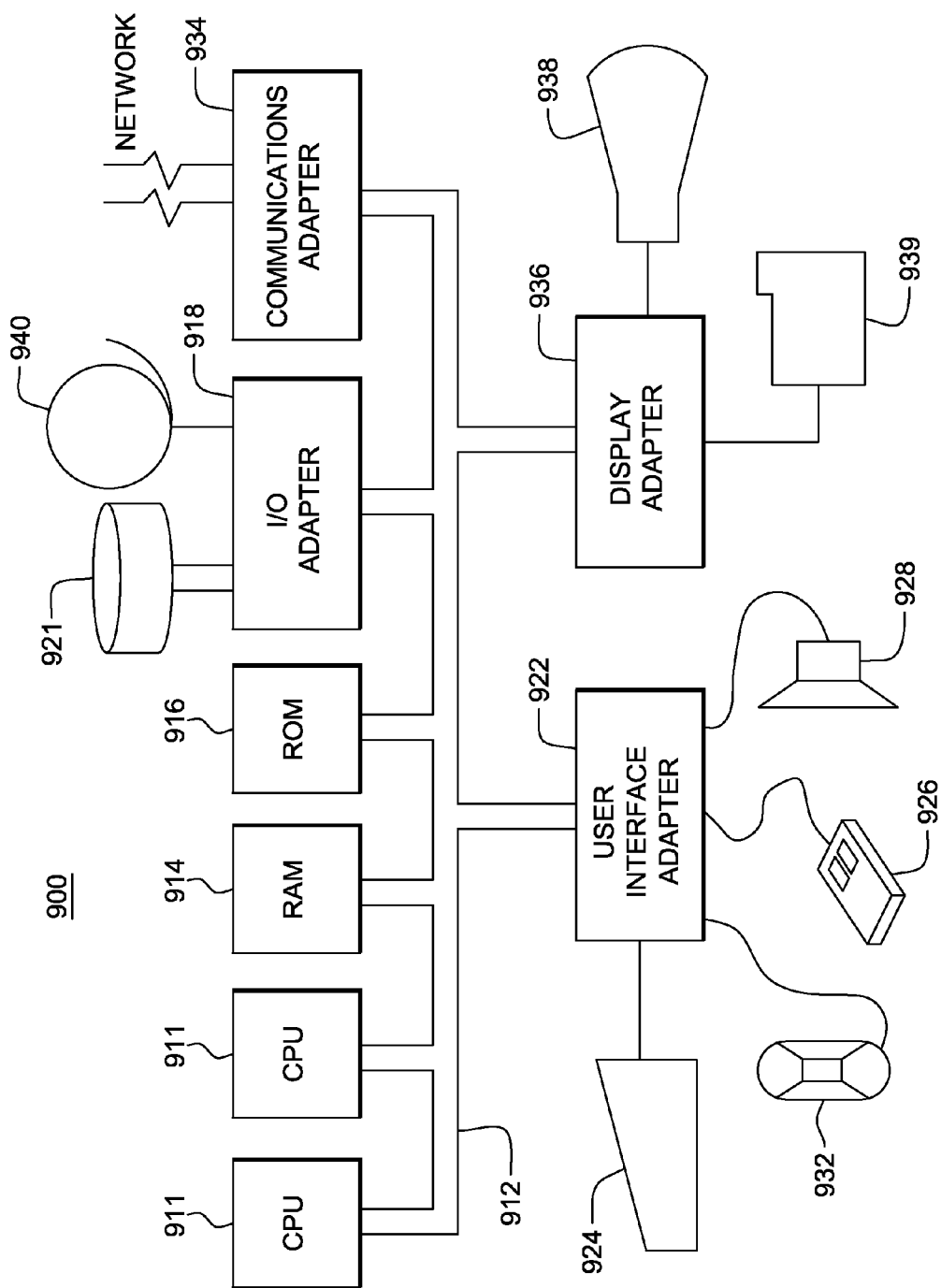

Thus, in one embodiment, the method and computer program product may be used by and operate within a DSR collaborative platform. These memory steps including instructions stored in memory that are accessed and operated by a programmed processor device, such as shown in FIG. 12. Several vendors have implemented products relevant to DSR collaborative platforms and an overview of the technology is found in T. Chieu, S. Kapoor, A. Mohindra, A. Shaikh, "Cross Enterprise Improvements Delivered via a Cloud Platform: A Game Changer for the Consumer Product and Retail Industry," Services Computing, IEEE International Conference on, pp. 530-537, 2010 IEEE International Conference on Services Computing, 2010. A major advantage of the DSR environment is that it simplifies the data integration required for the demand modeling analysis, and in addition, it enables the results from the demand modeling analysis to be combined and coordinated with other decision-support components to improve the overall operational efficiency of the applications in the DSR environment.

One example of a coordinated set of DSR decision-support components arises in an inventory-optimization application for a retail chain, where the demand predictions from the modeling analysis (e.g., obtained using the herein described method) may be combined with data on the inventory positions and stocking levels, in order to determine the appropriate optimal stocking schedules; simultaneously, the impact of these schedules can also be evaluated from sales and orders data across the various stores of the retail chain within the DSR environment itself.

In one embodiment, retail decision-support systems with an operational focus may be used by DSR platforms. For example, Key Performance Indicators or KPI's (i.e., specific operational metrics that are defined with a focus on performance and diagnostic concerns) can be monitored in so-called "dash-boards" obtained from the evolving supply-chain data recorded in the DSR platform. These dash-boards provide rapid feedback to identify and rectify any performance issues in the retail supply chain.

In one aspect, in the context of a specific embodiment in a DSR platform, any accuracy improvements in the demand modeling component also significantly enhances the overall decision-support application; furthermore, these accuracy improvements can lead to a much broader range of tactical and strategic decision-support applications being supported in the DSR platform (including, but not limited to, such applications as assortment planning, product pricing and brand promotion, etc.).

Continuing, the method of FIG. 1, further includes the sub-processing 20 of imputing an estimated price and promotion dynamics model (that may be integrated in those applications having decision support capability) for the plurality of products in the designated product set in the retail category; the sub-processing 25 for estimating a market-share model for the plurality of products in the designated product set, based on unit-price in the primary sales data set, as well as based on any other relevant factors obtained from the auxiliary data sets; and the sub-processing 30 for estimating the overall market size for the entire designated product set from the retail category.

FIG. 2 schematically illustrates the data stored and accessed by (or as received as inputs to) the demand modeling system as operated via a programmed machine, e.g., a processor device as in FIG. 12, in an exemplary embodiment. The table 50 shown in FIG. 2A includes data obtained from the primary data source, e.g., sales data, and Table 75 shown in FIG. 2B includes product attributes data from an auxiliary data source. The table 50 from the primary data source providing the sales data, includes the data records for the unit sales (including unit quantity (products sold) column 58, revenue column 60 and unit price of a product as represented by column 62, and each record in table 50 corresponds to a product from the relevant choice set in a given store and in a given time period, e.g., a week. This table 50 is indexed by the product identifier column 54 including values such as Universal Product Category (UPC) or like barcode-implemented product identifier used for tracking products in retail stores; a location-based code column 52, such as TDLinx such as developed and used by AC Nielsen Company (http://www.nielsen.com/); see http://en-ca.nielsen.com/content/nielsen/en_ca/product_families/nielsen_trade_dimensions.html) in their retail data sets, whose value corresponds to a specific and unique retail channel, such as a store, an outlet or an account; and a date or time-stamp or a time-period index column 56, e.g., Week, e.g.,). The data from the non-primary or auxiliary data source, in this example, is stored as product attributes table 75, shown here configured for a product set, e.g., from a processed-food category identified by UPC column 54, with fields (columns) describing the manufacturer in column 64, packaging including size in column 66, a flavor in column 68, and various nutritional attributes of interest to the end-customer such as, in a non-limiting example, a total calories value in column 70, and, a total calories from fat value in column 72. In one embodiment, the product attribute data can be obtained from a product master table (not shown) that can be provided by the consumer goods manufacturers, and, the nutritional information from product label data that can be obtained from public databases using the product UPC code. Other tables, based on auxiliary data sources, may provide other relevant data on various store attributes, as well as attributes covering product-stocking and product-advertising data, which can also be used to improve the demand modeling analysis, as further illustrated in the specific embodiment described in detail below.

Figure 3:
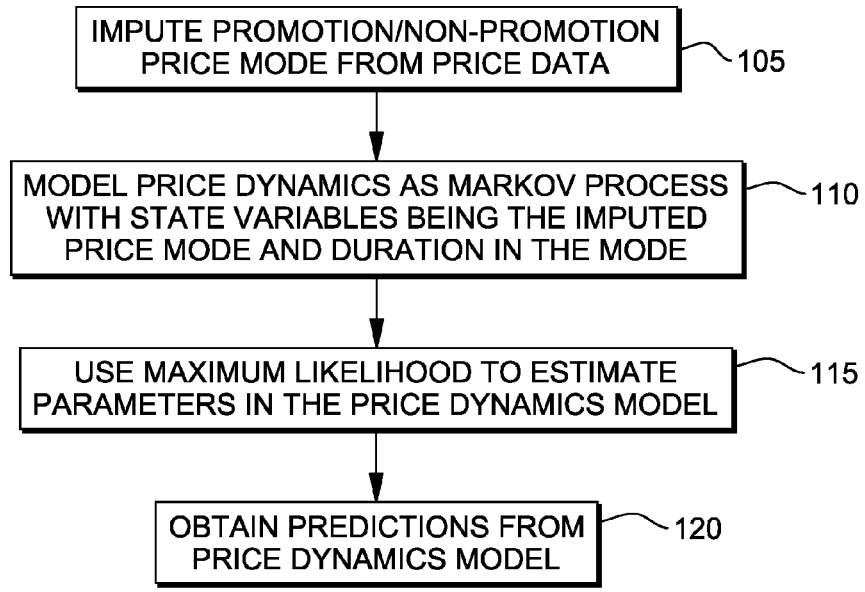
FIG. 3 illustrates a method for estimating the model for the price dynamics from the primary sales data.

FIG. 3 schematically illustrates the method steps 100 for estimating the model for the price dynamics from the primary sales data. In a first step 105, there is performed by computer programmed processing device a first step of mapping price values of the time series data to a corresponding price mode.

In the mapping performed at step 105, the time series for the unit prices for each (product, store) combination is a sequence of values that includes the regular price values of the product, where "regular" refers to the price of the product during a period of time when there are no discounts, sales or promotions on the product, with this regular price having its long-term trends and seasonal variations, along with "promotional" pricing values which are offered at possibly different discount levels at different points in time when the said product is not at the regular price. For instance in the case of a product in a frozen foods category, the long-term trend in the regular price would reflect the Consumer Product Index (CPI), or the varying costs of acquiring and refining the raw product that is passed on the consumer over a period of time, and the seasonal variations may reflect the increased consumption or demand for the product during a particular period of the year such as a season or a holiday event, while the promotional pricing values will reflect the pattern of discounts, sales and promotions that are offered to the consumer. The actual points in time when the product was in promotional pricing, as well as the specific values of the promotional discounts may not often be explicitly provided, particularly for competitor product data. Therefore, in one exemplary embodiment, these promotional events are inferred from the unit-price data itself.

In one aspect, the actual dynamics of the product pricing and promotion are identified self-consistently from the historic time series data itself. Generally, the methods steps for identifying the pricing and promotion dynamics using the time series of unit prices are mapped to a corresponding pricing mode is carried out by initially assigning products to regular or promotion pricing states in each sales reporting period based on a heuristic for identifying local maxima and minima in the time series unit-price data; and, improving the initial heuristic state assignments, to assign regular or promotion pricing for any remaining sales reporting periods. In one aspect, the method includes assigning of the price modes to each value in the price time series by:

1) searching for local peaks and valleys in the unit-price time series by first compressing all consecutive time-series values with the same unit price into a single entry; this shortens the length of the time series while retaining the important information relevant for identifying the price dynamics. Then, from the shortened series, identify the unit-price values that are the strictly local maxima or "peaks", and the strictly local minima or "valleys."

2) mapping the values corresponding to the peaks and valleys to initial estimates for their price mode values, e.g., the peak values are mapped to mode 1 which denotes the regular pricing mode, and similarly, the valley values are mapped to mode 0 which denotes the promotion pricing mode. These initial values are further refined and corrected in description of (3) and (4) below);

3) screening out any "pseudo" peak and valley values from this initial set of peak and valley values. Among the peak (resp. valley) values selected in (1), there are some values which are quite different from the regular price (resp. promotion price) nearby, so these are screened out, in one embodiment, and the initial assignments for these "pseudo" values revised using, for example, the following approach: Suppose $p_t$ is a peak (resp. valley) value, and $\bar{p}$ and $\bar{p}'$ are two peak values around $p_t$, and similarly, $\underline{p}$ and $\underline{p}'$ are two valley values around $p_t$. Then $\tilde{p}_t$ is denoted as the average of the four prices introduced above, and if $p_t < \tilde{p}_t$ (resp. >), then $p_t$ is deleted from the set of peak (resp. valley) values. Similarly, for the two valley (resp. peak) values near it, the one with higher (resp. lower) price is deleted from the set of valley (resp. peak) values.

4) mapping all the remaining non-peak/valley price values also to price modes. First, there is considered each non-peak/valley price $p_t$, and search for the nearest peak and valley values that contain the value $p_t$ in the ordering of the time-series sequence, and computing average price $\tilde{p}_t$ for the peak and valley values selected above. Finally, map $p_t$ to mode 1 (resp. 0) if $p_t > \tilde{p}_t$ (resp. <). This completes the assignment of the price modes to each value in the price time series.

In a second step 110 of FIG. 3, there is performed by computer programmed processing device, a step of modeling the dynamics of the price mode transition process.

There are several sources of uncertainty in the dynamics of the price mode process which determine whether for the next period, the price will stay in the same price mode or transition to the other mode. Furthermore, the relevant probabilities for the inter-mode transitions underlying the price mode dynamics can vary as a function of time, and consequently, the average duration that the price process spends in each mode before a transition can also vary as a function of time. In one embodiment, the method for modeling the dynamics of the price mode transition process captures all these characteristics in the method steps performed by a programmed processing device as follows:

First, a defined state variable $Z_t = (m_t, d_t)$ is input, where $m_t$ denotes the mode, and $d_t$ denotes the duration (or the number of consecutive prior reporting periods without a transition) in mode $m_t$ at time t. $\Pi_{Z',Z,t}$ is denoted as the state transition probability from state Z to Z' at time t, and this state transition probability is then given by $$\prod_{m',d',m,d,t} = \begin{cases} \pi_{md,t}, & \text{if } m \neq m' \text{ and } d' = 1, \\ \bar{\pi}_{md,t}, & \text{if } m = m' \text{ and } d' = d + 1 \\ 0, & \text{otherwise,} \end{cases}$$

where $\bar{\pi}_{md,t} = 1 - \pi_{md,t}$ where $\pi_{md,t}, \bar{\pi}_{md,t}$ are state transition probabilities; m,m' refer to two price modes, and d,d' refer to the two corresponding durations at these two price modes. The state transition probability is assumed to be given by a logit model, in the form $$\log \frac{\pi_{md,t}}{\overline{\pi}_{md,t}} = \beta_{md} + X_t\beta_2 \equiv Y_{md,t}\beta,$$

for $m \in \{0,1\}, d \in \{1, 2, 3, \ldots\}$ having the parameters $\beta = \{\beta_{md}, \beta_2\}$, which are constants that must be estimated by fitting this model to the price dynamics data using a suitable regression procedure for this "logit" model as described below. Here, in this model, the $\beta_{md}$ is the coefficient of a dummy variable corresponding to the fixed effect of the price mode and duration (m,d) on the state transition probability, while the $\beta_2$ are the coefficients of the variables that corresponds to any auxiliary information $X_t$ available at time t, including, for example, lagged variables corresponding to the historic price information on competitor products at time t, and finally $Y_{md,t}$ is the combination of the dummy variables and auxiliary variables and is introduced for notational simplicity. This "logit" model yields the following closed-form solution:

$$\pi_{md,t} = \frac{\exp(Y_{md,t}\beta)}{\exp(Y_{md,t}\beta) + 1}$$

$$\overline{\pi}_{md,t} = \frac{1}{\exp(Y_{md,t}\beta) + 1}.$$

In a third step 115, there is performed by a programmed processing device, a step of calibrating the price mode process by using maximum likelihood estimation.

The dynamics of the price mode transition process as modeled above is calibrated from the sales data using the maximum-likelihood method to estimate the relevant model parameters. Equivalently, given the data for a time series of length T consisting of the price modes and the corresponding durations $\{m_t, d_t\}$ for $t=1, \ldots, T$, the log-likelihood function has the following form:

$$\log L = \sum_{t=1}^{T-1} [I[m_t \neq m_{t+1}]\pi_{m_t d_t, t} + I[m_t = m_{t+1}]\overline{\pi}_{m_t d_t, t}],$$

whence it can be ascertained that the required parameter estimation is carried out by solving the following optimization problem:

$$\min_{\beta} \sum_{t=1}^{T-1} [\log(\exp(Y_{m_t d_t, t}\beta) + 1) - I[m_t \neq m_{t+1}]Y_{m_t d_t, t}\beta].$$

Here, the inputs to the optimization problem are the time series of length T consisting of the price modes and the corresponding durations $\{m_t, d_t\}$ for $t=1, \ldots, T$, and the outputs are the fitted values for the parameters $\beta = \{\beta_{md}, \beta_2\}$.

The method steps for this optimization are available in many standard statistical packages for logit modeling such as SAS, SPSS and R (for instance the R package Design documented at http://cran.r-project.org/web/packages/Design/Design.pdf), and variations of these standard procedures can also be implemented by persons with ordinary skill in the art.

In a fourth step 120, there is performed by computer programmed processing device, a step of obtaining unit price predictions from price-mode dynamics model.

After estimating parameters β in the model price mode process as described above, the mode transition probabilities $\pi_{md,t}$ and $\overline{\pi}_{md,t}$ are explicitly computed from the price mode transition process model herein above, by substituting the values of $Y_{md,t}$ and β and many of the standard statistical packages for logit modeling such as SAS, SPSS and R described herein above will also provide an "apply" function for obtaining these mode transition probabilities from the estimated model, and variations of this procedure can also be implemented by persons with ordinary skill in the art. The prediction of the unit price is then obtained from the price-mode dynamics model in one example embodiment, according to the following: Given a time period, if the price mode is unchanged in the next time period, then the predicted price is also left unchanged at the same value; otherwise, if there is a price mode transition, then the predicted price is set to a value that is closest to a current period from among the periods in which prices were in the new price mode, as described in specific detail below.

More specifically, after computing the estimates of the parameters $\beta = \{\beta_{md}, \beta_2\}$ in the price mode transition process model, at time t, by observing $Y_{m_t d_t, t}$, the mode transition probabilities, $\pi_{m_t d_t, t}, \overline{\pi}_{m_t d_t, t}$ at time t are estimated and the actual price at time t for mode $m_t$ denoted as $p_{m_t, t}$. In order to differentiate between actual and predicted unit prices, the hat symbol "$\hat{p}$" is used herein to denote the corresponding predicted unit prices. With probability $\pi_{m_t d_t, t}$ the price mode at time t+1 transitions to the alternate mode, and in this case, therefore, the corresponding predicted price is given by $p_{1-m_t, t'}$,
where $t' = \max\{s: s < t, m_s = 1 - m_t\}$. Otherwise, with probability $\overline{\pi}_{m_t d_t, t}$, the price mode does not undergo a transition to the alternate mode, and in this case, the predicted price remains at $p_{1-m_t, t'}$. In case a point prediction is needed for the unit price, rather than the price distribution, then the following formula may be used to obtain the predicted unit price at time t+1, $$\hat{p}_{t+1} = \pi_{m_t d_t, t} p_{1-m_t, t'} + \overline{\pi}_{m_t d_t, t} p_{m_t, t'}.$$

Figure 4:
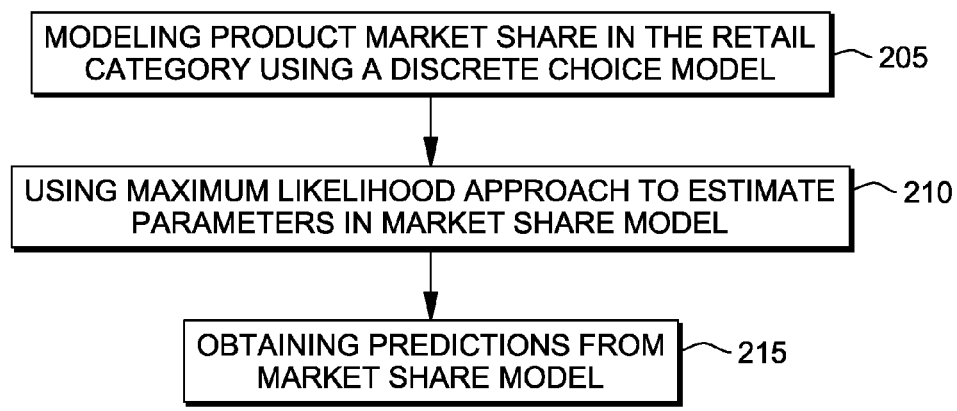
FIG. 4 illustrates the method for estimating the model for the market share of the individual products in the retail category from the primary sales data set, and from any auxiliary data set.

FIG. 4 describes the method 200 performed by a programmed processing device to predict market share for each product in terms of the unit price predictions and other product and store data (e.g., the store-level sales data, as well as the data on the relevant product, inventory, promotion and store attributes) including:

1) Modeling, by a computer programmed processing device, a product market share in the retail category using a discrete choice model as shown at step 205, FIG. 4. In one aspect, this includes modeling the unit-sales for the products in each (week, store) combination using the choice probability model, such as a mixed multinomial choice model, described in greater detail below, in which the unit-prices of all products in the category, product attributes, promotion attributes, inventory stocking attributes and store attributes as model predictors.

The products in the retail category are segmented into groups, so that each segment comprises of a product choice set of substitutable or complementary products, which together comprise the "choice set" as mentioned earlier. The discrete-choice model then assumes that the purchase utility for each product in the relevant segment is modeled as follows: for a given consumer indexed by i, the utility to purchase product j in store/market m is given by $$u_{ijm}(\alpha, \beta) = X_j\beta - \alpha p_{jm} + \epsilon_{ijm},$$

where $X_j$ is a vector consisting of any attributes specifically associated with product j, $p_{jm}$ denotes the price for product j in store m, $\epsilon_{ijm}$ is a random variable that is assumed to follow a Gumbel distribution, which characterizes consumer heterogeneity (e.g., as described in D. L. McFadden (1981), "Econometric Models of Probabilistic Choice," in *Structural Analysis of Discrete Data with Econometric Applications*, C. F. Manski and D. L. McFadden (eds.), 198-272, MIT Press, Cambridge, Mass.; D. L. McFadden (1982), "Qualitative Response Models," in W. Hildenbrand (ed.), *Advances in Econometrics*, Econometric Society Monographs, Cambridge University Press.). Based on this model for the product purchase utility $u_{ijm}(\alpha,\beta)$, the market share for product j in store m can be expressed in the form $$S_{jm}(\alpha, \beta) = \frac{\exp(X_j\beta - \alpha p_{jm})}{\sum_{j' \in m} \exp(X_{j'}\beta - \alpha p_{j'm})}.$$

In this formula, the parameters $(\alpha,\beta)$ are unknowns which are estimated from the data sources referred to in FIG. 2, using the following procedure:

2) Using a computer programmed processing device to implement a maximum likelihood approach to estimate parameters in market share model as shown at step 210, FIG. 4.

The parameters $(\alpha,\beta)$ in the maximum-likelihood model are estimated using the maximum likelihood method, by solving the following optimization problem:

$$(\hat{\alpha}, \hat{\beta}) = \arg\max \prod_{j,m} \left( \frac{\exp(X_j\beta - \alpha p_{jm})}{\sum_{j' \in m} \exp(X_{j'}\beta - \alpha p_{j'm})} \right)^{n_{jm}},$$

where $n_{jm}$ denotes the unit sales for product j in store m, $X_j$ is a vector consisting of any attributes specifically associated with product j, and $p_{jm}$ denotes the price for product j in store m, with all these input quantities being obtained from the data sources referred to in FIG. 2. The outputs from solving this optimization problem are the estimates $(\hat{\alpha},\hat{\beta})$ for the market share model described herein above. The optimization problem can be solved by using standard software available in statistical packages such as SAS, SPSS and R (for example, the mlogit package in R), and variants of the same can be implemented by one with ordinary skill in the art.

3) Obtaining, by a computer programmed processing device, predictions of the market share from the market share model as shown at step 215, FIG. 4.

After obtaining the estimators $\hat{\alpha},\hat{\beta}$ by solving optimization problem above, the market share for product m in store m, denoted by $\hat{S}_{jm}$ can be predicted using $$\hat{S}_{jm} = \frac{\exp(X_j\hat{\beta} - \hat{\alpha}p_{jm})}{\sum_{j' \in m} \exp(X_{j'}\hat{\beta} - \hat{\alpha}\hat{p}_{j'm})}.$$

However, the actual unit prices for the competitor products are unknown in general, and therefore are not directly specified as data for estimating the market share values. Therefore, the actual unit prices, in one embodiment, can be replaced by predicted unit prices $\hat{p}_{j'm}$ for the purpose of predicting the product market share from this formula.

Figure 5:
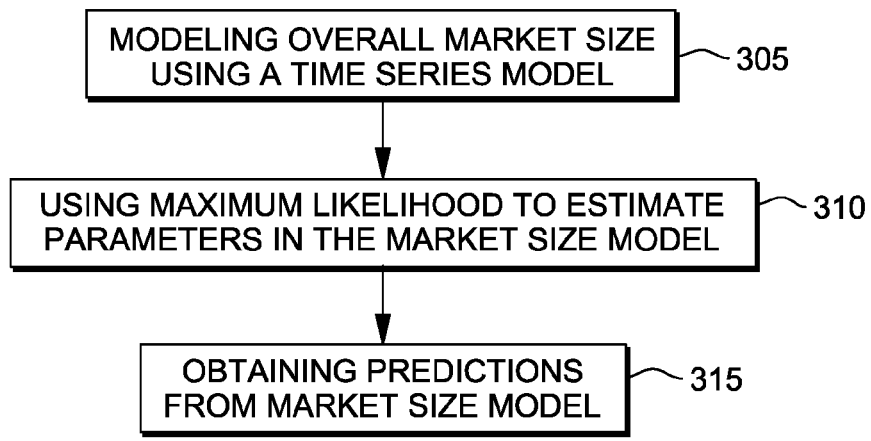
FIG. 5 illustrates the method for estimating the overall market share model from the primary sales data, price dynamics model and market share model.

FIG. 5 illustrates the method 300 performed by a programmed processing device for predicting the overall market size, or, equivalently predicting the aggregate unit sales for all the products in the selected choice set from the retail category including:

1) modeling, by a computer programmed processing device, the overall market size using a time-series model as shown at step 305, FIG. 5.

The overall market size is modeled as a time series which may include any exogenous factors that are appropriate to the product set and retail category. These exogenous factors may include seasonal category-specific dummy variables, and various macro-economic indicators, such as those provided by the United States Bureau of Economic Analysis (http://www.bea.gov) and similar organizations in other nations, as well as similar international organizations. The specific form for the market size at time t is denoted by $M_t$, and in one preferred embodiment, can be modeled as a linear regression $$M_t = Z_t\gamma + \xi_t,$$

where $Z_t$ is a vector comprising all the relevant seasonal and macro-economic variables for the product category of interest, which might include the Consumer Price Index, Product-specific inflation indexes, dummy variables to indicate seasonality or holiday effects in the product category, etc.; $\xi_t$ is a noise term, which is assumed to comprise of independent and identically distributed values from a Normal distribution. The unknown model parameters $\gamma$ are estimated from the data as described below.

2) estimating, by a computer programmed processing device, parameters in market-size model using maximum likelihood as shown at step 310, FIG. 5

The parameters $\hat{\gamma}$ are estimated by solving the following optimization problem:

$$\hat{\gamma} = \arg\min \sum_t \xi_t^2$$

which can be solved using standard packages for least-squares analysis, such as those provided in well-known statistical software such as SAS, SPSS and R, and, 3) obtaining, by a computer programmed processing device, predictions for the market size from market-size model as shown at step 315, FIG. 5.

The predicted market size at time t, denoted as $\hat{M}_t$, is evaluated from the market size model by the formula:

$$\hat{M}_t = Z_t\hat{\gamma}.$$

In one non-limiting, illustrative embodiment, a demand model and forecaster is generated using the method steps described herein that produce demand models and forecasts in various categories. One example relates to a grocery retail category comprising, for example, packaged food items with a retail shelf life of about a week. Although the particular embodiment is based on a "real-world" sales data set, it is sufficient for the purpose of illustrating the method steps and describing the results, to use a generic description of the data with any product-specific and category-specific details being abstracted away.

The relevant sales data for the retail product category used here, therefore, comprises of weekly-aggregated data on unit-sales and unit-prices for 333 products with unique UPC's, obtained from 146 stores whose TDLinx codes are within the same metropolitan market geography, with this data being obtained for a 3 year period from 2006 to 2009 (representing an overall revenue of about 75 million US dollars). Each record in this data set, contains unique fields for the UPC, TDLinx, Week along with the corresponding unit-sales and unit-price for each such (product, store, and week) combination over which the weekly-aggregated sales data has been reported. Additionally, detailed information on the attributes of the products in the sales data set is also obtained from the product master-data file, which contains information such as brand, packaging, size, quality attribute and product type. Finally, since the product category being analyzed corresponds to an example processed-food category, certain data pertaining to the health-benefits, nutritional composition and product quality was ascertained from public-domain databases which provide the relevant product-label information.

Figure 6:
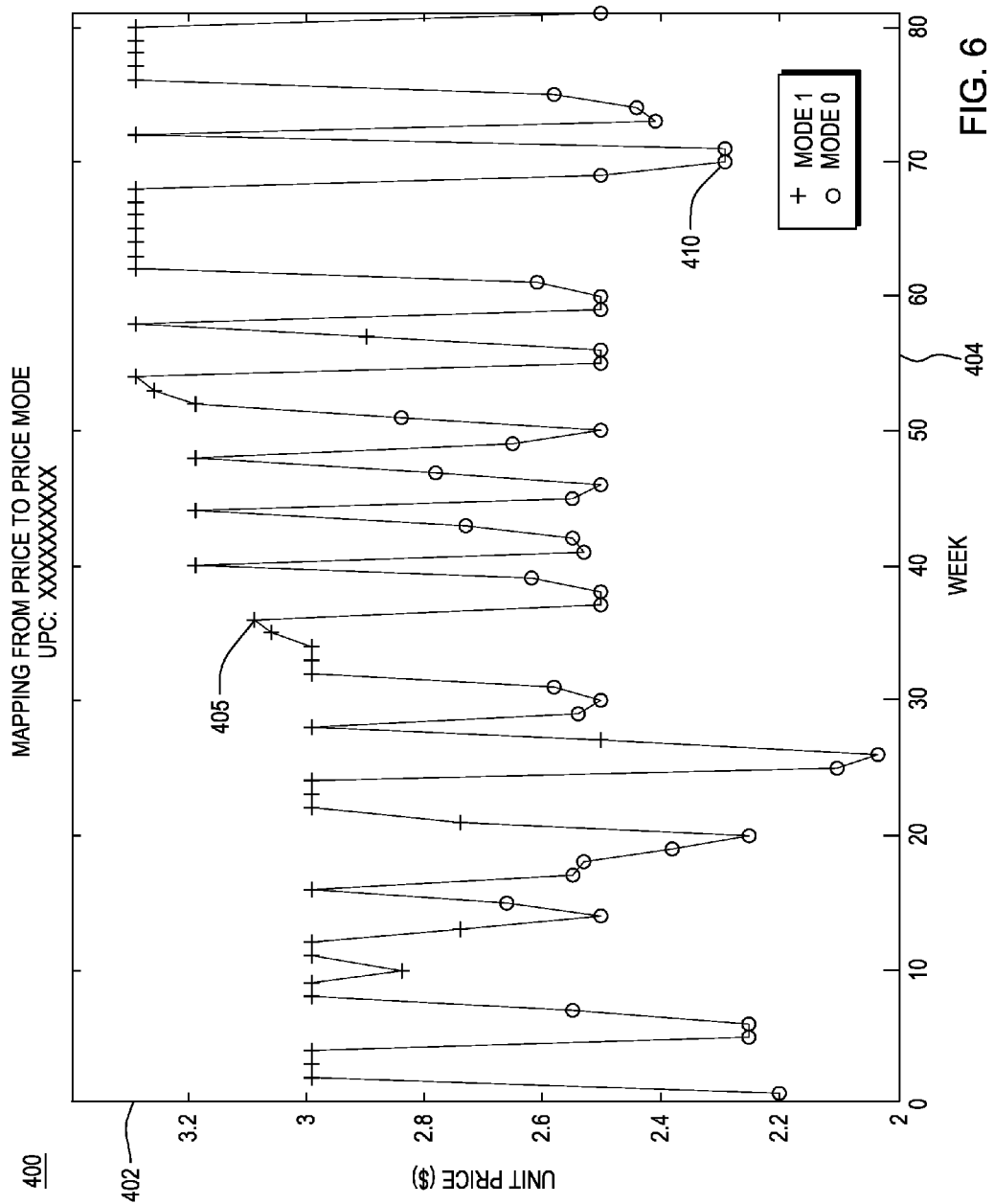
FIGS. 6-8 illustrate an example application of the method for the model of the price dynamics, showing respectively, the mapping from the time series price data to the price modes, the estimation of the Markov model for price dynamics from the price modes and mode durations, and the forecast price predictions.

FIG. 6 illustrates an example of the mapping result 400 shown on a plot including unit price on the y-axis 402 as a function of time on x-axis 404. The plot shows a mapping of price time series (unit price data) to the price mode for a specific (product, store) combination, or equivalently, for a specific (e.g., UPC, TDLinx) combination. The method steps to transform the unit price data are carried out with the first 81 weeks of the time series data being used to estimate the parameters underlying the price mode mapping process. Based on the analysis, the mode values are marked with asterisk 405 (resp. circle 410) corresponding to mode 1 (resp. mode 0).

Figure 7:
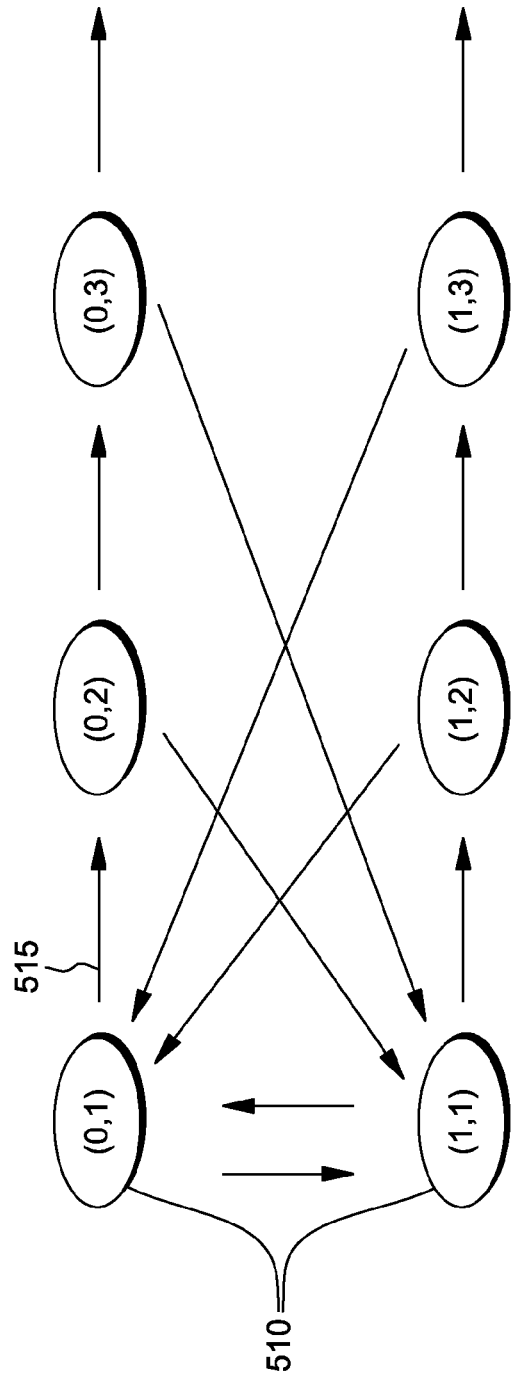

FIG. 7 describes an example specification of the Markov transition process 500 for the price mode dynamics for each (UPC, TDLinx) combination. In the transition graph, the graph nodes 510 represent Markov states parameterized by the price mode 502 and duration in the price mode (in time periods 505). The arrows 515 in the graph represent the transition between two corresponding states, and only allowable transitions between Markov states have arrows between the corresponding nodes in this transition graph. The method steps described herein with respect to FIGS. 3-5, 7 may be used to estimate the transition probabilities in this Markov transition graph from the relevant unit-price time series data for the (e.g., UPC, TDLinx) combination.

Figure 8:
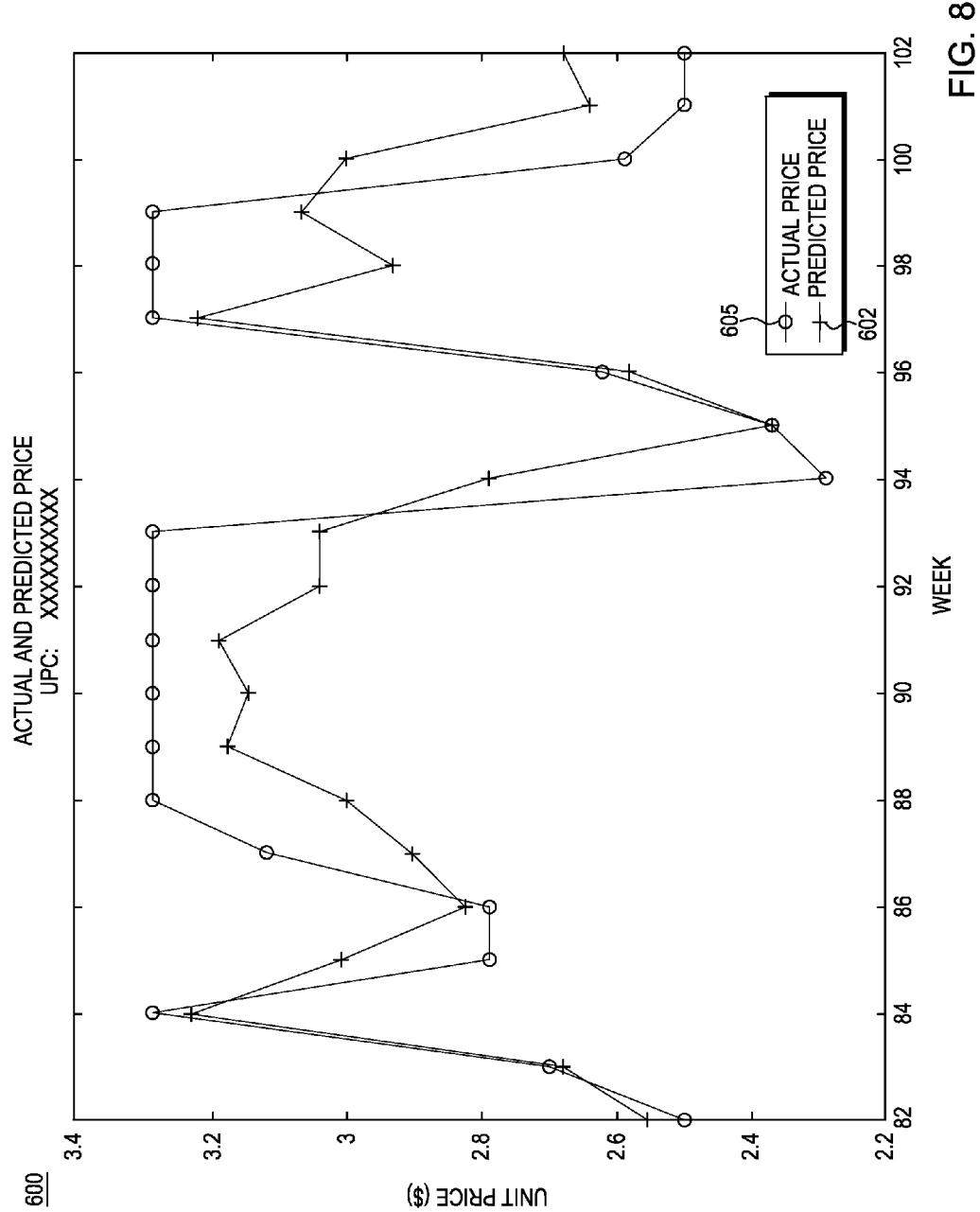

FIG. 8 illustrates an example of using the price dynamics model for forecasting 600 in the case of a specific (e.g., UPC, TDLinx) combination. The predicted unit prices 602 for weeks 81 through 102 (plotted on time axis) are shown based on the method steps of the price dynamics modeling, wherein the data in the first 81 weeks (not shown) have been used for fitting the model parameters. FIG. 8 shows a plot including unit price on the y-axis as a function of time on x-axis for time period subsequent to the 81 weeks depicted in FIG. 6. The plot compares the predicted price dynamics 602 obtained from the method described herein with the actual price dynamics 605 that were observed during that time period (wherein it is reiterated that the actual price values show complicated dynamics with multiple transitions between promotional and non-promotional pricing for the product, which are difficult to capture by directly using traditional time-series forecasting techniques). These results demonstrate the accuracy and reliability of the method for forecasting the future price dynamics from the historic sales data.

Figure 9:
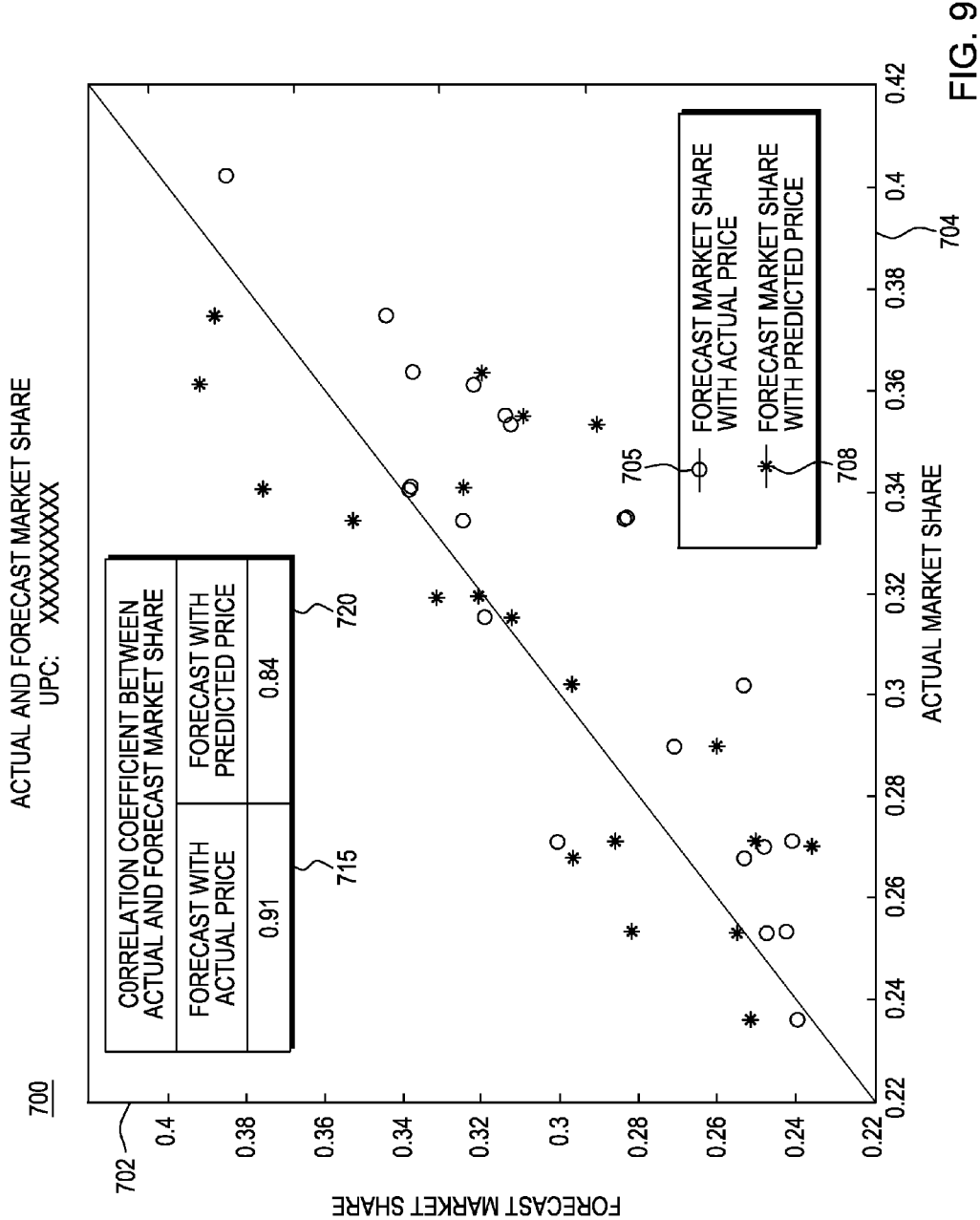
FIGS. 9-10 illustrate the application of the method for the model of the market share for the products in the product set with an example, showing respectively, the effects of the unit price factor from the primary data set on the demand model (FIG. 9), and the improvements obtained by incorporating various product attributes from the auxiliary data sets in the demand model (FIG. 10), and this market-share model can be combined with the price-dynamics model above to obtain market-share predictions for the products in the product set.

FIG. 9 illustrates an example of using the market-share models as generated according to the method described herein for forecasting product market share in the product set, for the same (e.g., UPC, TDLinx) combination chosen in FIG. 8. As shown in FIG. 9, the forecasts 700 for the market-share values between weeks 81 and 102 are obtained from the method steps of the market-share modeling, wherein the data in the first 81 weeks (not shown) are used for fitting the model parameters. The plot 700 of FIG. 9 depicts forecasted market shares on the y-axis 702 with the actual market shares on the x-axis 704 that were observed during the same time period, for two cases wherein the forecasted market shares are obtained by both using the actual prices represented as shares 705 and the predicted prices represented as shares 708, respectively. FIG. 9 also shows the correlation coefficient between actual market shares and forecasted market shares, wherein an example correlation coefficient 715 is computed using forecasted market shares obtained by using actual prices and an example correlation coefficient 720 is computed using forecasted market shares 720 obtained by using predicted prices. The correlation coefficient between two vectors X and Y is equal to the covariance cov(X,Y) divided by the product of the standard deviations s(x)m s(Y) of X and Y, and can take values between −1 and +1; a value of the correlation coefficient near +1 or −1 indicates that the variables X and Y are linearly dependent whereas a value close to 0 indicates that the variables are linearly independent. These results demonstrate the accuracy and reliability for forecasting the future market shares from the historic sales data using the price dynamics model as a precursor to the market share model.

Figure 10:
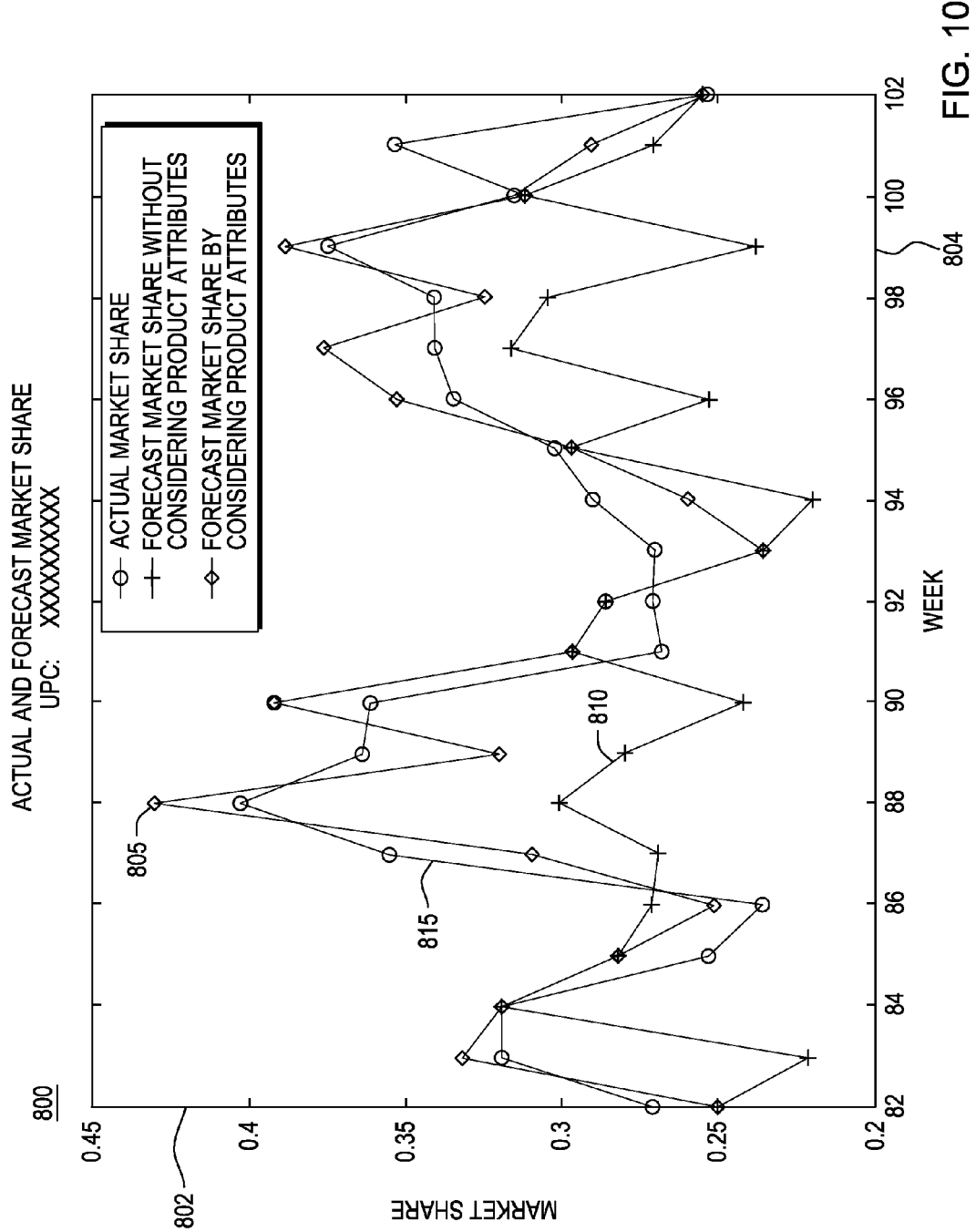

FIG. 10 illustrates an example of accuracy improvements by using product attributes information in the demand modeling, where considering the same (UPC, TDLinx) combination as in FIG. 8, the market shares between weeks 81 and 102 in FIG. 10 are forecasted as shown plotted on graph 800 having market share values y-axis 802 plotted against time on x-axis 804, with the data in the first 81 weeks (not shown) being used for fitting the model parameters of the price dynamics and market-share models. FIG. 10 shows two scenarios: the first showing forecasted market shares 805, in which only the product unit price is used from the primary sales data (i.e., without considering product attributes), and the second showing forecasted market shares 810, in which the primary sales data is augmented with the product attribute data. FIG. 10 shows the actual market share 815 for comparison. It is readily seen in FIG. 10 the significant improvement in market-share model accuracy as a consequence of incorporating product attributes from the auxiliary data sets in the demand modeling.

Figure 11:
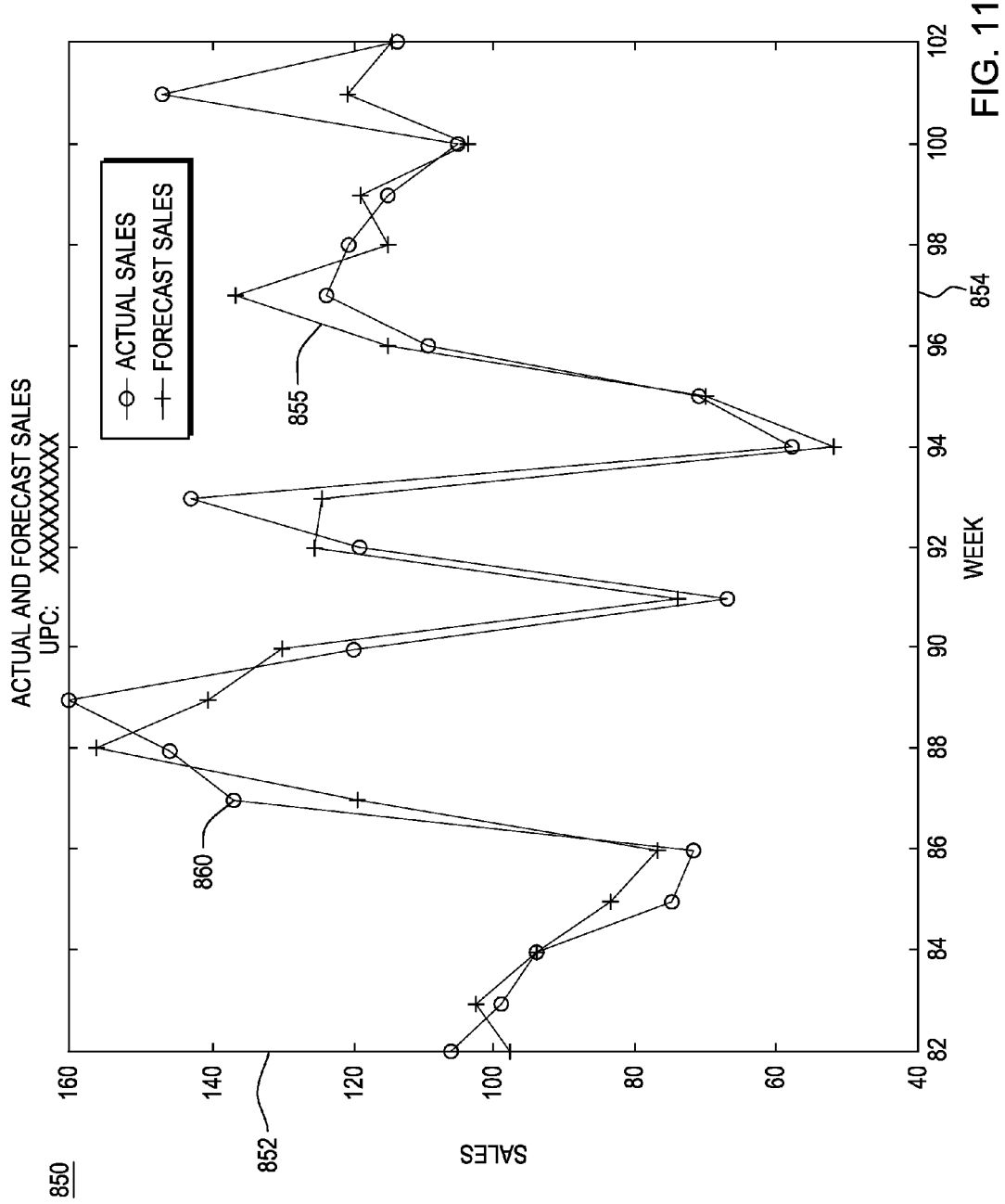
FIG. 11 illustrates the application of the method steps for the model of the overall market size for the product set, with an example in which this market-size model can be combined with the market-share model above to above to obtain predictions for the unit-sales for each product in the product set; and, FIG. 12 illustrates an exemplary hardware configuration to run method steps described in FIGS. 1, 3-5 in one embodiment.

FIG. 11 illustrates an example plot 850 of forecasted sales 855 obtained by combining the three method steps for obtaining the price prediction model, discrete choice model for market share, and time series model for market size. FIG. 11 plots forecasted sales values on y-axis 852 against time on x-axis 854 in the case of a specific (e.g., UPC, TDLinx) combination, which is the same as FIG. 8. The sales between weeks 81 and 102 in FIG. 10 are forecasted using the method steps illustrated from FIG. 3 to FIG. 5, wherein the data in the first 81 weeks (not shown) are used for fitting model parameters. The price dynamics model and the market share model are identical to those described in FIGS. 8-10 above, and the overall market size is estimated directly from the observed data. An alternative forecasting technique can be implemented when the observed value for the overall market share is not known. The results show the close correspondence between the actual predicted unit sales 860 for one of the products from the product set.

Thus, the system and method provides more comprehensive and accurate demand models. Improved accuracy and suitability of the models is achieved in several ways, for example: by using a historic aggregated retail sales data set from multiple stores and multiple reporting time periods and combining this data with other factors that influence price, availability, consumer taste and demographics for the demand modeling analysis; by modeling the time series movements of self and competitor prices in order to predict the movement and collective dynamics for the distribution of product prices in the retail category; by modeling the individual product demand in terms of market share in the retail category, primarily incorporating self and cross-elasticities with respect to product unit-price, and well as incorporating other demand choice factors such as branding, advertising, packaging and other consumer choice factors in estimating the market share and demand; and, by modeling the overall market demand for the retail category by directly extrapolating the historic demand for stable, slowly-varying categories, or otherwise, by using category purchase-incidence models that account for the variations in the selected retail category, or otherwise, by a combination of these methods; subsequently, using this overall market demand in conjunction with the market share models for predicting the individual product demands.

FIG. 12 illustrates an exemplary hardware configuration of the computing system 900. The hardware configuration preferably has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting the system 900 to a data processing network, the Internet, an Intranet, a local area network (LAN), etc., and a display adapter 936 for connecting the bus 912 to a display device 938 and/or printer 939 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A computer-implemented method for demand modeling and prediction for a set of products in a retail category, the method comprising:

obtaining aggregated sales data in a retail category, said aggregated sales data comprising a combination of: a first sales data set having a time series of unit-prices and unit sales for a set of designated products in a product set from said retail category, said time series data being provided over a sequence of sales reporting periods from one or more retail stores; and, a second sales data set including data associated with attributes of a product in said first sales data set;

generating a model for price movements and price dynamics from said time series data of unit-prices in the aggregated sales data;

generating a model for market share of each said product in the retail category using the aggregated sales data and said integrated additional product attribute data;

generating a model for an overall market demand in the retail category from the aggregated sales data; and, obtaining a predicted demand for one or more said products in the designated product set in retail category by combining the models for said price movements and price dynamics, said market share, and said overall market demand, wherein a programmed processor device performs said obtaining, said generating a price movement model, said generating a market share model, said generated overall market demand and said combining.

2. The computer-implemented method according to claim 1, wherein the generating a model for price movements and price dynamics from the time-series sales data of unit-prices comprises:

mapping price values from said time series of unit-prices to a corresponding price mode;

modeling dynamics of a price mode transition process; and, calibrating the price mode transition process by using a maximum likelihood estimation technique to estimate model parameters, wherein unit price predictions are obtained from said price dynamics model.

3. The computer-implemented method according to claim 2, wherein the mapping from price values to the corresponding price mode comprises:

searching for local maxima and local minima values in the unit-price time series and initially assigning a product to either a non-discounted pricing mode or a discounted pricing mode in each sales reporting period based on identified local maxima and minima; and, assigning a label corresponding to non-discounted pricing mode or discounted pricing mode for any pseudo peaks or valley unit-price values in said sales reporting periods.

4. The computer-implemented method according to claim 3, wherein the modeling dynamics of a price mode transition process comprises:

estimating, from the times series unit-price data, transition probabilities for a Markov model for switching from the non-discounted pricing mode to the discounted pricing mode and, vice-versa, from said discounted pricing mode to the non-discounted pricing mode.

5. The computer-implemented method according to claim 4, wherein the estimating transition probabilities for said Markov model from a non-discounted pricing mode to the discounted pricing mode and, vice-versa, from said discounted pricing mode to the non-discounted pricing mode, comprises:

modeling the transition probabilities based on the estimated non-discounted or discounted pricing modes, and, a duration in the estimated state of non-discounted or discounted pricing mode.

6. The computer-implemented method according to claim 5, wherein the estimating transition probabilities for said Markov model is further based on one or more factors responsible for discounted pricing mode, said factors embodied as auxiliary variables including one or more of: seasonality, holidays, or the promotion activities of all products in the designated product set of the retail category.

7. The computer-implemented method according to claim 2, wherein said generating a model for market share of each product in the designated product set in the selected retail category using the aggregated sales data comprises:

modeling a distribution of the unit-sales data for the product for each combination of a time duration and a retail store using a discrete-choice probability model, said discrete-choice probability modeling utilizing unit-prices of all products in the designated product set in the retail category, and said product attributes data as model predictors.

8. The computer-implemented method according to claim 7, wherein the generating a model for said overall market demand in each store for the designated product set in the selected retail category from the retail store-level sales data comprises:

estimating the overall market demand by extrapolating historic demand for designated product set in retail categories using one of: autoregressive, moving average or exponential smoothing models for relatively stable and complete product categories;

determining a variation in the market demand due to the presence of alternative choices to the designated product set in the selected retail category; and, estimating overall market demand, including said variation, for product set in designated retail category using a regression model with an expected maximum utility of making a purchase in the selected retail category as a model variable.

9. The computer-implemented method according to claim 8, wherein the obtaining a predicted demand for the product by combining the models for price movements and price dynamics, market share and overall market demand comprises:

specifying a price movement for future time steps, according to a pre-determined price and promotion schedule;

predicting the price movement by stepwise extrapolating the Markov models for the remaining products in the product category for the case when specified price and promotion schedules are not pre-determined;

predicting the market shares from the demand model, for as many time steps as required, using the specified and predicted price movements for all the products in the retail category;

predicting the overall market demand, by extrapolating historic demand for designated product set in retail categories using one of: autoregressive, moving average or exponential smoothing models for stable and complete product categories; and,
combining the market-share predictions with the predictions for the overall market demand to produce a prediction for the unit-sales for any subset of products in the designated product set in the retail category.

10. A system for demand modeling and prediction for a set of products in a retail category comprising:
a processor unit; and
at least one memory device connected to the processor unit, wherein the processor unit is configured to:
obtain aggregated sales data in a retail category, said aggregated sales data comprising a combination of: a first sales data set having a time series of unit-prices and unit sales for a set of designated products in a product set from said retail category, said time series data being provided over a sequence of sales reporting periods from one or more retail stores; and, a second sales data set including data associated with attributes of a product in said first sales data set;
generate a model for price movements and price dynamics from said time series data of unit-prices in the aggregated sales data;
generate a model for market share of each said product in the retail category using the aggregated sales data and said integrated additional product attribute data;
generate a model for an overall market demand in the retail category from the aggregated sales data; and,
obtain a predicted demand for one or more said products in the designated product set in retail category by combining the models for said price movements and price dynamics, said market share, and said overall market demand.

11. The system according to claim 10, wherein for generating a model for price movements and price dynamics from the time-series sales data of unit-prices, said processor unit is configured to:
map price values from said time series of unit-prices to a corresponding price mode;
model dynamics of a price mode transition process; and,
calibrate the price mode transition process by using a maximum likelihood estimation technique to estimate model parameters, wherein unit price predictions are obtained from said price dynamics model.

12. The system according to claim 11, wherein to map from price values to the corresponding price mode, said processor unit is configured to:
search for local maxima and local minima values in the unit-price time series and initially assigning a product to either a non-discounted pricing mode or a discounted pricing mode in each sales reporting period based on identified local maxima and minima; and,
assigning a label corresponding to a non-discounted pricing mode or discounted pricing mode for any pseudo peaks or valley unit-price values in said sales reporting periods.

13. The system according to claim 12, wherein to model dynamics of a price mode transition process, said processor unit is configured to:
estimate, from the times series unit-price data, transition probabilities for a Markov model for a switching from the non-discounted pricing mode to the discounted pricing mode and, from said discounted pricing mode to the non-discounted pricing mode.

14. The system according to claim 13, wherein to estimate transition probabilities for said Markov model from a non-discounted pricing mode to the discounted pricing mode and, vice-versa, from said discounted pricing mode to the non-discounted pricing mode, said processor unit is configured to:
model the transition probabilities based on the estimated non-discounted or discounted pricing modes, and, a duration in the estimated state of non-discounted or discounted pricing mode.

15. The system according to claim 14, wherein said estimate of transition probabilities for said Markov model is further based on one or more factors responsible for discounted pricing mode, said factors embodied as auxiliary variables including one or more of: seasonality, holidays, or the promotion activities of all products in the designated product set of the retail category, a competitor.

16. The system according to claim 11, wherein to generate a model for market share of each product in the retail category using the aggregated sales data, said processor unit is configured to:
model a distribution of the unit-sales data for the product for each combination of a time duration and a retail store using a discrete-choice probability model, said discrete-choice probability modeling utilizing unit-prices of all products in the designated product set in the retail category, and said product attributes data as model predictors.

17. The system according to claim 16, wherein to generate a model for said overall market demand in each store for the selected market category from the retail store-level sales data, said processor unit is configured to:
estimate the overall market demand by extrapolating historic demand for designated product set in retail categories using one of: autoregressive, moving average or exponential smoothing models for relatively stable and complete product categories;
determine a variation in the market demand due to the presence of alternative choices to the designated product set in the selected retail category; and,
estimate overall market demand, including said variation, for product set in designated retail category using a regression model with an expected maximum utility of making a purchase in the selected retail category as a model variable.

18. The system according to claim 17, wherein to obtain a predicted demand for the product by combining the models for price movements and price dynamics, market share and overall market demand, said processor unit is configured to:
specify a price movement for future time steps, according to a pre-determined price and promotion schedule;
predict the price movement by stepwise extrapolating the Markov models for the remaining products in the product category for the case when specified price and promotion schedules are not pre-determined;
predict the market shares from the demand model, for as many time steps as required, using the specified and predicted price movements for all the products in the retail category;
predict the overall market demand, by extrapolating historic demand for designated product set in retail categories using one of: autoregressive, moving average or exponential smoothing models for stable and complete product categories; and,
combine the market-share predictions with the predictions for the overall market demand to produce a prediction for the unit-sales for any subset of products in the designated product set in the retail category.

19. A computer program device for demand modeling and prediction for a set of products in a retail category, the computer program device comprising a tangible storage medium readable by a processing circuit and storing instructions run by the processing circuit for performing a method, the method comprising: generating a model for price movements and price dynamics from said time series data of unit-prices in the aggregated sales data; generating a model for market share of each said product in the retail category using the aggregated sales data and said integrated additional product attribute data; generating a model for an overall market demand in the retail category from the aggregated sales data; and, obtaining a predicted demand for one or more said products in the designated product set in retail category by combining the models for said price movements and price dynamics, said market share, and said overall market demand.

20. The computer program device according to claim 19, wherein the generating a model for price movements and price dynamics from the time-series sales data of unit-prices comprises: mapping price values from said time series of unit-prices to a corresponding price mode; modeling dynamics of a price mode transition process by estimating, from the times series unit-price data, transition probabilities for a Markov model for switching from a non-discounted pricing mode to the discounted pricing mode and, from said discounted pricing mode to the non-discounted pricing mode; and, calibrating the price mode transition process by using a maximum likelihood estimation technique to estimate model parameters, wherein unit price predictions are obtained from said price dynamics model.

21. The computer program device according to claim 20, wherein said generating a model for market share of each product in the designated product set in the selected retail category using the aggregated sales data comprises:

modeling a distribution of the unit-sales data for the product for each combination of a time duration and a retail store using a discrete-choice probability model, said discrete-choice probability modeling utilizing unit-prices of all products in the designated product set in the retail category, and said product attributes data as model predictors.

22. The computer program device according to claim 21, wherein the generating a model for said overall market demand in each store for the designated product set in the selected retail category from the retail store-level sales data comprises:

estimating the overall market demand by extrapolating historic demand for designated product set in retail categories using one of: autoregressive, moving average or exponential smoothing models for relatively stable and complete product categories;

determining a variation in the market demand due to the presence of alternative choices to the designated product set in the selected retail category; and, estimating overall market demand, including said variation, for product set in designated retail category using a regression model with an expected maximum utility of making a purchase in the selected retail category as a model variable.

23. The computer program device according to claim 22, wherein the obtaining a predicted demand for the product by combining the models for price movements and price dynamics, market share and overall market demand comprises:

specifying a price movement for future time steps, according to a pre-determined price and promotion schedule;

predicting the price movement by stepwise extrapolating the Markov models for the remaining products in the product category for the case when specified price and promotion schedules are not pre-determined;

predicting the market shares from the demand model, for as many time steps as required, using the specified and predicted price movements for all the products in the retail category;

predicting the overall market demand, by extrapolating historic demand for designated product set in retail categories using one of: autoregressive, moving average or exponential smoothing models for stable and complete product categories; and, combining the market-share predictions with the predictions for the overall market demand to produce a prediction for the unit-sales for any subset of products in the designated product set in the retail category.

24. The computer-implemented method according to claim 1, wherein said designated product set includes a set of products in the retail category including products with substitution or cross-elasticity effects.

* * * * *